United States Patent
Sakai et al.

(10) Patent No.: US 9,484,817 B2
(45) Date of Patent: Nov. 1, 2016

(54) DC/DC CONVERTER

(71) Applicant: FANUC CORPORATION, Yamanashi (JP)

(72) Inventors: Yoshinori Sakai, Yamanashi (JP); Masataka Tsuchimoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/725,152

(22) Filed: May 29, 2015

(65) Prior Publication Data

US 2015/0349642 A1 Dec. 3, 2015

(30) Foreign Application Priority Data

May 30, 2014 (JP) .................. 2014-112364

(51) Int. Cl.
| | |
|---|---|
| *H02M 3/158* | (2006.01) |
| *H02M 3/156* | (2006.01) |
| *H02M 3/157* | (2006.01) |
| *H02M 1/00* | (2006.01) |

(52) U.S. Cl.
CPC ............. *H02M 3/158* (2013.01); *H02M 3/157* (2013.01); *H02M 3/1563* (2013.01); *H02M 2001/008* (2013.01)

(58) Field of Classification Search
CPC .................................................. H02M 3/158
See application file for complete search history.

(56) References Cited

U.S. PATENT DOCUMENTS

| | | | |
|---|---|---|---|
| 2007/0013350 A1* | 1/2007 | Tang ................... | H02M 3/1584 323/237 |
| 2008/0310200 A1* | 12/2008 | Maksimovic ....... | H02M 3/1584 363/65 |
| 2010/0270989 A1 | 10/2010 | Sasaki et al. | |
| 2011/0298439 A1 | 12/2011 | Ng et al. | |
| 2015/0207400 A1* | 7/2015 | Shenoy ............... | H02M 3/1584 323/213 |

FOREIGN PATENT DOCUMENTS

| | | |
|---|---|---|
| JP | 2010-259280 A | 11/2010 |
| JP | 2011-259686 A | 12/2011 |
| JP | 2013-62966 A | 4/2013 |
| JP | 2013-243875 A | 12/2013 |

* cited by examiner

*Primary Examiner* — Emily P Pham
(74) *Attorney, Agent, or Firm* — Hauptman Ham, LLP

(57) ABSTRACT

In a DC/DC converter, each channel operates under digital control using nonlinear control. The time interval between the time of turning ON of the switching element 1 and the time of turning ON of each of other switching elements j (j=2, 3, . . . , N) is measured. If the measured interval is within a specified range, operation is continued without changing the ON time of the switching element j used last time. Meanwhile, if the measured interval is out of the range, the ON time of the switching element j is increased or decreased within a predetermined range to be shifted from a basic frequency. Thus, the interval between the time of turning ON of the switching element 1 and the time of turning ON of the switching element j is brought back to the specified range.

1 Claim, 4 Drawing Sheets

US 9,484,817 B2

DC/DC CONVERTER

RELATED APPLICATIONS

The present application claims priority of Japanese Application Number 2014-112364, filed May 30, 2014, the disclosure of which is hereby incorporated by reference herein in its entirety.

BACKGROUND OF THE INVENTION

1. Field of the Invention

The present invention relates to a two- or more-channel digitally controlled DC/DC converter using fixed ON-time nonlinear control.

2. Description of the Related Art

Methods for controlling a DC/DC converter using analog control include nonlinear control called hysteresis control. In this hysteresis control, an output voltage feedback system does not include an error amplifier, and phase compensation is unnecessary. Accordingly, a very-high-speed response can be provided.

FIG. 4 is a diagram showing one example of a two-channel power supply circuit using hysteresis control. FIG. 5 is a diagram showing an input ripple current waveform of two-channel hysteresis control.

A switching power supply circuit of a first channel includes switching elements 21 and 31, a driver 81 for alternately driving the switching elements 21 and 31, and an LC filter 91. The driver 81 is controlled by a negative feedback circuit based on a comparator CMP1. Similarly, a switching power supply circuit of a second channel includes switching elements 22 and 32, a driver 82 for alternately driving the switching elements 22 and 32, and an LC filter 92. The driver 82 is controlled by a negative feedback circuit based on a comparator CMP2. It should be noted that in FIG. 4, Vref refers to a reference voltage. In this example of a power supply circuit shown in FIG. 4, the current waveform of the first channel and the current waveform of the second channel overlap each other as shown in FIG. 5.

Moreover, in a DC/DC converter using PWM control, a ripple current through an input capacitor can be reduced by shifting the phases of switching of respective channels of the two- or more-channel DC/DC converter to reduce overlaps between ON times of switching elements of the respective channels.

FIG. 6 is a diagram showing a two-channel power supply circuit using PWM control. FIG. 7 is a diagram showing an input ripple current waveform of the two-channel power supply using PWM control.

A switching power supply circuit of a first channel includes switching elements 21 and 31, a driver 81 for alternately driving the switching elements 21 and 31, and an LC filter 91. The driver 81 is controlled by a negative feedback circuit based on an error amplifier AMP1. Similarly, a switching power supply circuit of a second channel includes switching elements 22 and 32, a driver 82 for alternately driving the switching elements 22 and 32, and an LC filter 92. The driver 82 is controlled by a negative feedback circuit based on an error amplifier AMP2. It should be noted that in FIG. 6, Vref refers to a reference voltage.

It should be noted that the following fact has also been known: in the case where a nonlinearly controlled DC/DC converter is stably controlled in a certain steady operating state, a frequency f is constant and determined by an input voltage Vin, an output voltage Vo, and an ON time ton of a switching element $2i$. In the case of a non-isolated synchronous rectification step-down DC/DC converter such as shown in FIGS. 1 and 4, the frequency f is represented by the following expression (1):

$$f = Vo/(Vin \times ton) \tag{1}$$

Japanese Patent Application Laid-Open Nos. 2010-259280, 2011-259686, 2013-062966, 2013-243875, and the like disclose switching power supplies, but none of them are intended to reduce a ripple current through an input capacitor.

To realize a high-speed response in a DC/DC converter, nonlinear control such as hysteresis control is needed because linear control such as PWM control has limitations. It should be noted, however, that if nonlinear control such as hysteresis control is applied to a two- or more-channel DC/DC converter, overlaps between ON times of the switching elements increase depending on the phases of switching of respective channels. This increases a ripple current through an input capacitor, and affects the life of the input capacitor. Meanwhile, if linear control such as PWM control is applied to a two- or more-channel DC/DC converter, a ripple current through an input capacitor can be reduced because it is easy to shift the phases of switching of the respective channels, but it is difficult to provide a high-speed response.

SUMMARY OF THE INVENTION

Accordingly, in view of the above-described problems of prior art techniques, an object of the present invention is to provide a two- or more-channel digitally controlled step-down DC/DC converter which uses nonlinear control and in which a reduction in a ripple current through an input capacitor is realized by controlling phase differences between channels.

A DC/DC converter according to the present invention is a two- or more-channel digitally controlled step-down DC/DC converter using fixed ON-time nonlinear control, including switching power supply circuits of first to N-th (where N is an integer not less than 2) channels, the switching power supply circuits being connected to an input terminal in parallel; A/D converters for converting output voltages outputted from output terminals of the switching power supply circuits of the respective channels to digital signals; and an arithmetic processing unit receiving the digital signals converted by the A/D converters. Each of the switching power supply circuit includes a switching element having a first terminal connected to the input terminal to be turned on and off, an inductor having a first terminal connected to a second terminal of the switching element, a capacitor connected between a second terminal of the inductor and 0 volt, and a driving circuit for driving the switching element. The arithmetic processing unit is configured to measure a time interval between a time at which the switching element of the switching power supply circuit of the first channel has been turned ON and a time at which the switching element of the switching power supply circuit of the relevant one of the second to N-th channels has been turned ON, in case where the arithmetic processing unit determines that the switching element of the switching power supply circuit of each of the second to N-th channels has been turned ON. And, if the measured time interval is within a specified range, the arithmetic processing unit continues operation without changing an ON time of the switching power supply circuit used last time. On the other hand, if the measured time interval is out of the specified range, the arithmetic processing unit increases or decreases the ON time of the switching element within a specified time range and continues operation so that the time interval may be brought back to the specified range, thereby shifting phases of switching of the switching elements of the power supply circuits of the respective channels to reduce overlaps between the ON times of the switching elements of the respective channels.

According to the present invention, in the two- or more-channel digitally controlled DC/DC converter using nonlinear control, in a state in which there is little frequency fluctuation, except for cases such as a sudden load change, a high-speed response and a reduction in a ripple current through an input capacitor can be realized by maintaining a difference between the phases of switching of the respective channels at a certain level or higher. Moreover, in cases such as a sudden load change, overlaps between ON times of the switching elements momentarily increase to generate a large ripple current in the input capacitor, but a long-term ripple current through the input capacitor can be controlled at a level equivalent to that of linear control such as PWM control by gradually shifting the phases of switching of the respective channels.

BRIEF DESCRIPTION OF THE DRAWINGS

The forgoing and other objects and feature of the invention will be apparent from the following description of preferred embodiments of the invention with reference to the accompanying drawings, in which.

DETAILED DESCRIPTION OF THE PREFERRED EMBODIMENTS

Figure 1:
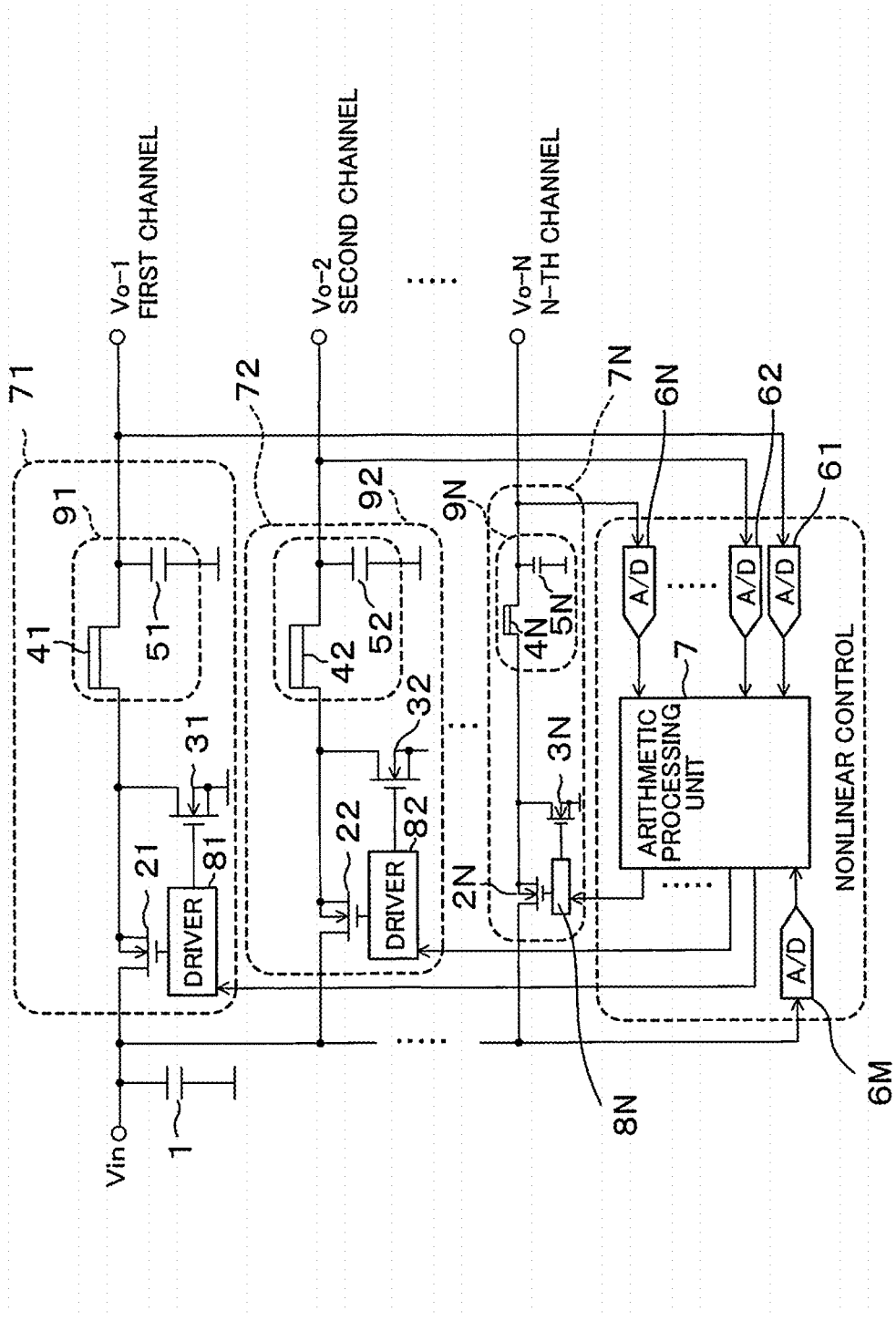
FIG. 1 is a diagram showing a DC/DC converter according to the present invention which includes a two- or more-channel nonlinearly-and-digitally controlled power supply circuit.

A DC/DC converter according to the present invention will be described with reference to FIG. 1.

The DC/DC converter is a two- or more-channel digitally controlled step-down DC/DC converter which uses fixed ON-time nonlinear control and which includes switching power supply circuits (nonlinearly-and-digitally controlled power supply circuits) $71, 72, \ldots, 7N$ of first to N-th (where N is an integer not less than 2) channels connected to an input terminal in parallel, A/D converters $61, 62, \ldots, 6N$ for converting output voltages outputted from output terminals of the switching power supply circuits $71, 72, \ldots, 7N$ of the respective channels to digital signals, and an arithmetic processing unit 7 receiving the digital signals converted by the A/D converters $61, 62, \ldots, 6N$. The arithmetic processing unit 7 also receives a signal which is a digital signal generated from the input voltage by an A/D converter 6M.

Each switching power supply circuit $7i$ ($i=1, 2, \ldots, N$) includes switching elements $2i$ and $3i$ having first terminals connected to the input terminal Vin to be turned on and off, an inductor $4i$ having a first terminal connected to a second terminal of the switching element $2i$, a capacitor $5i$ connected between a second terminal of the inductor $4i$ and 0 V, and a driver $8i$ for alternately driving the switching elements $2i$ and $3i$. It should be noted that the inductor $4i$ and the capacitor $5i$ constitute an LC filter $9i$.

The arithmetic processing unit 7 of the DC/DC converter determines whether the switching element $2j$ of the switching power supply circuit $7j$ ($j=2, 3, \ldots, N$) of each of the second to N-th channels has been turned ON or not. If it is determined that the switching element $2j$ has been turned ON, the arithmetic processing unit 7 measures the time interval between the time at which the switching element 21 of the switching power supply circuit 71 of the first channel has been turned ON and the time at which the switching element $2j$ of the switching power supply circuit $7j$ has been turned ON. Then, if the measured time interval is within a specified range, the arithmetic processing unit 7 continues operation without changing the ON time of the switching power supply circuit $7j$ used last time, and, meanwhile, if the measured time interval is out of the specified range, the arithmetic processing unit 7 increases or decreases the ON time of the switching element $2j$ within a specified time range and continues operation so that the time interval may be brought back to the specified range. Thus, the phases of switching of the switching elements 21 to 2N of the switching power supply circuits 71 to 7N of the respective channels are shifted so that overlaps between ON times of the switching elements of the respective channels may be reduced.

At this time, the switching elements 31 to 3N are driven by the drivers 81 to 8N so as to be turned ON during OFF times of the switching elements 21 to 2N.

In the switching power supply circuit 71 of the first channel of FIG. 1, from a basic operating frequency fch1 which enables a stable control during a steady operation, the ON time of the switching element 21 is determined in advance using an input voltage Vin and an output voltage Vo-1. Similarly, from a range of frequencies which enables a stable control during a steady operation in the switching power supply circuits 72 to 7N of the second to N-th channels, an ON time range of the switching element $2j$ ($j=2, 3, \ldots, N$) is determined. At this time, the basic operating frequency fch1 of the first channel should be involved in the frequency range of the second to N-th channels. Moreover, from the basic operating frequency fch1 and the number of channels N, the range of the interval between the time of turning ON of the switching element 21 of the switching power supply circuit 71 of the first channel and the time of turning ON of the switching element $2j$ of the switching power supply circuit $7j$ of each of the second to N-th channels j ($j=2, 3, \ldots, N$) is determined so that overlaps between ON times of the switching elements 22 to 2N may be reduced.

Figure 2:
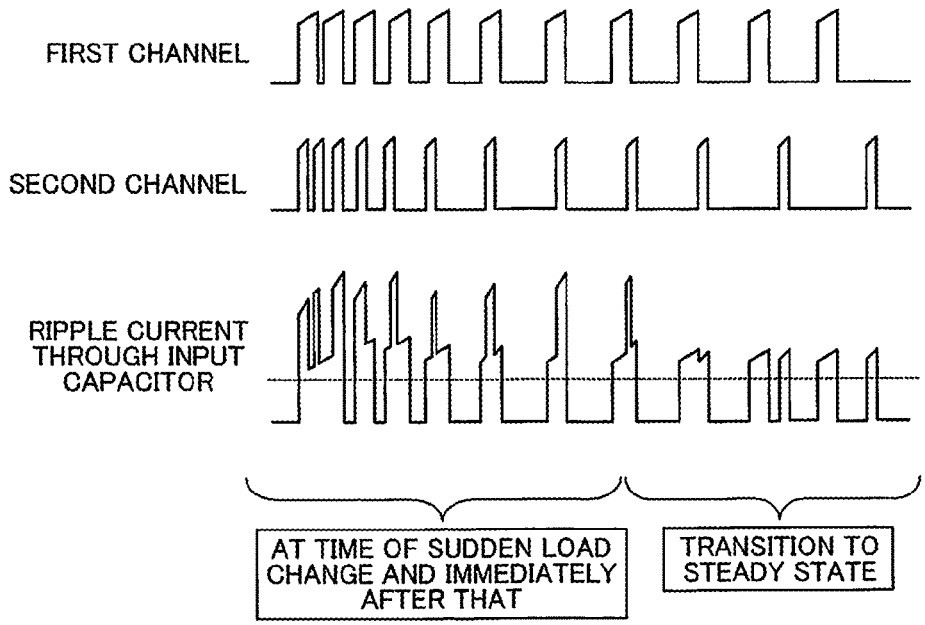
FIG. 2 is a diagram showing an input ripple current waveform of a two-channel nonlinearly-and-digitally controlled power supply.

FIG. 2 shows an input ripple current waveform of the two-channel nonlinearly-and-digitally controlled power supply according to the present invention.

In a period in which frequency fluctuation is large, there are overlaps between ON times of the switching elements of the first channel and the second channel, and an input ripple current increases. However, the input ripple current is reduced by performing control so that the overlaps between ON times may be eliminated as the frequency fluctuation decreases.

Figure 3:
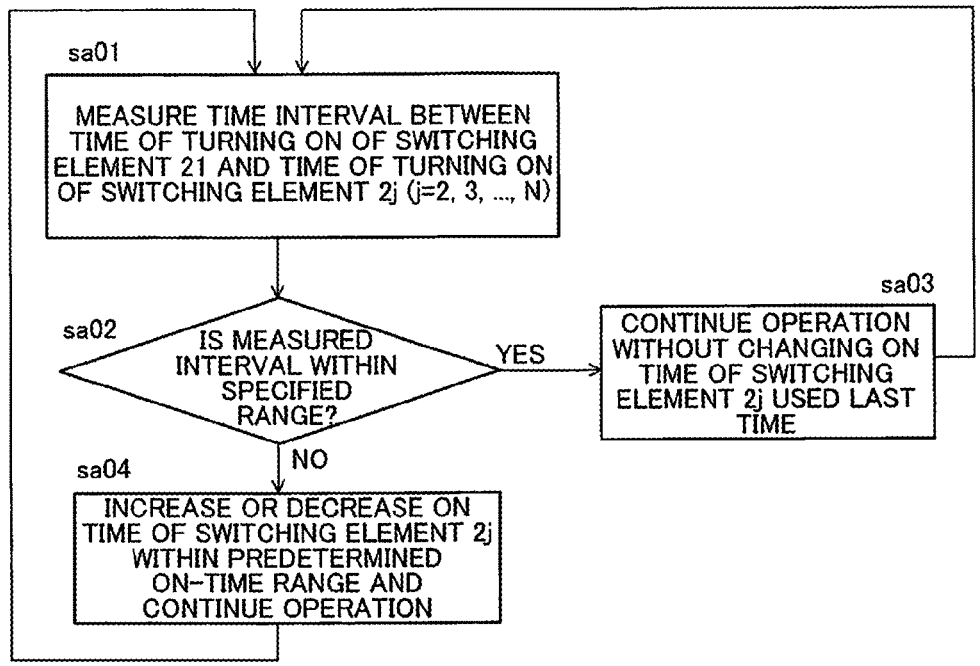
FIG. 3 is a flowchart showing ON-time control for switching elements which is carried out by an arithmetic processing unit of the DC/DC converter of FIG. 1.
Figure 4:
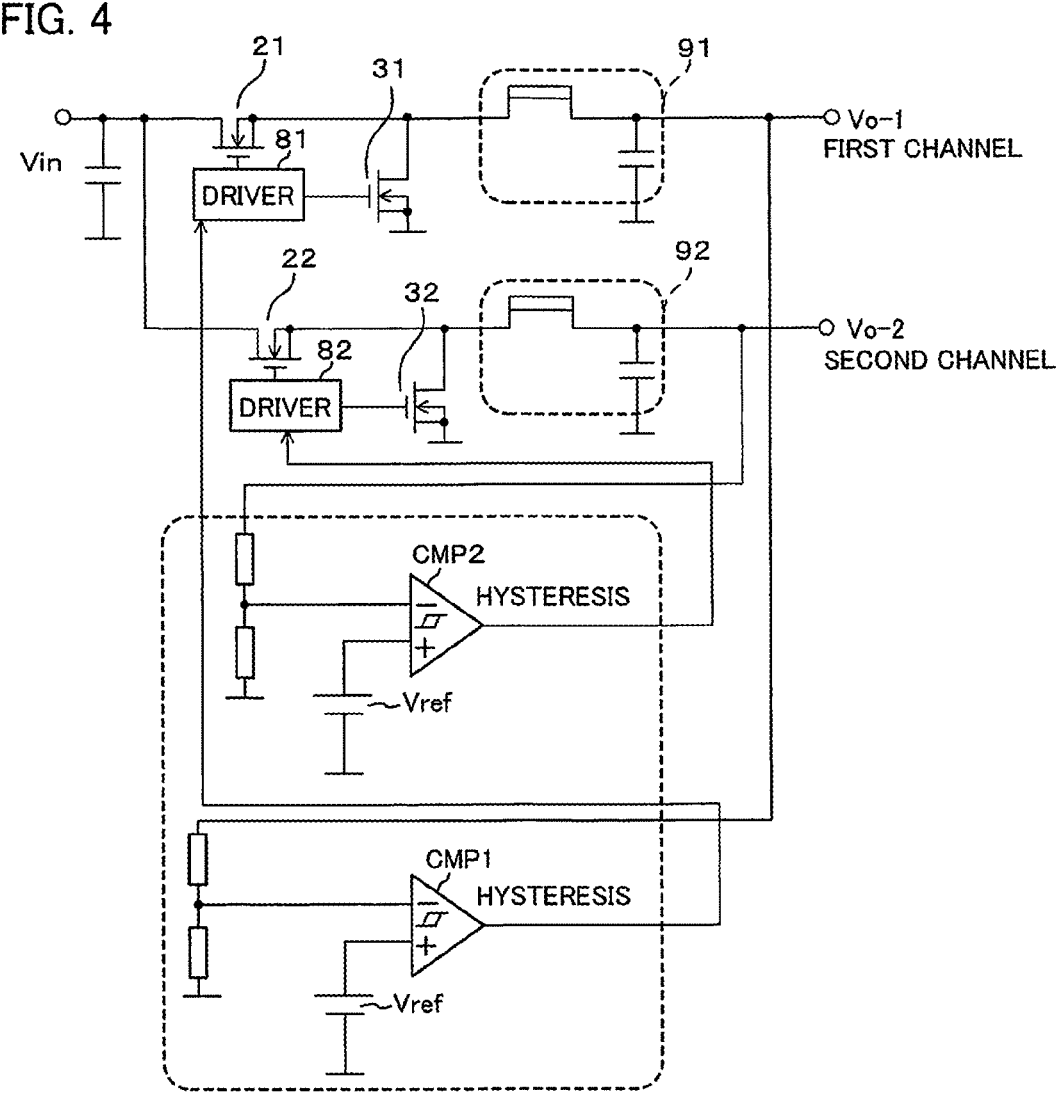
FIG. 4 is a diagram showing a prior-art two-channel power supply circuit using hysteresis control.
Figure 5:
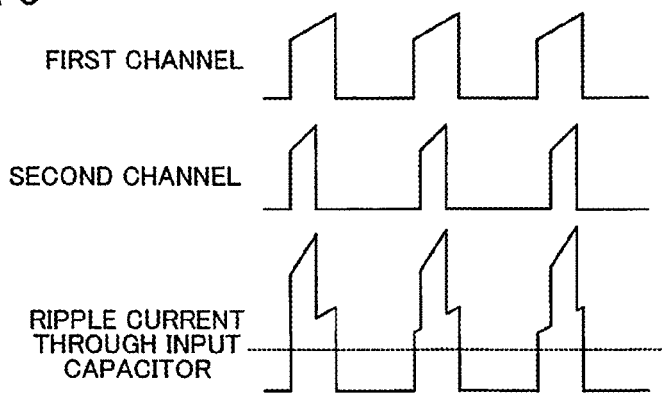
FIG. 5 is a diagram showing an input ripple current waveform of the prior-art two-channel hysteresis control.
Figure 6:
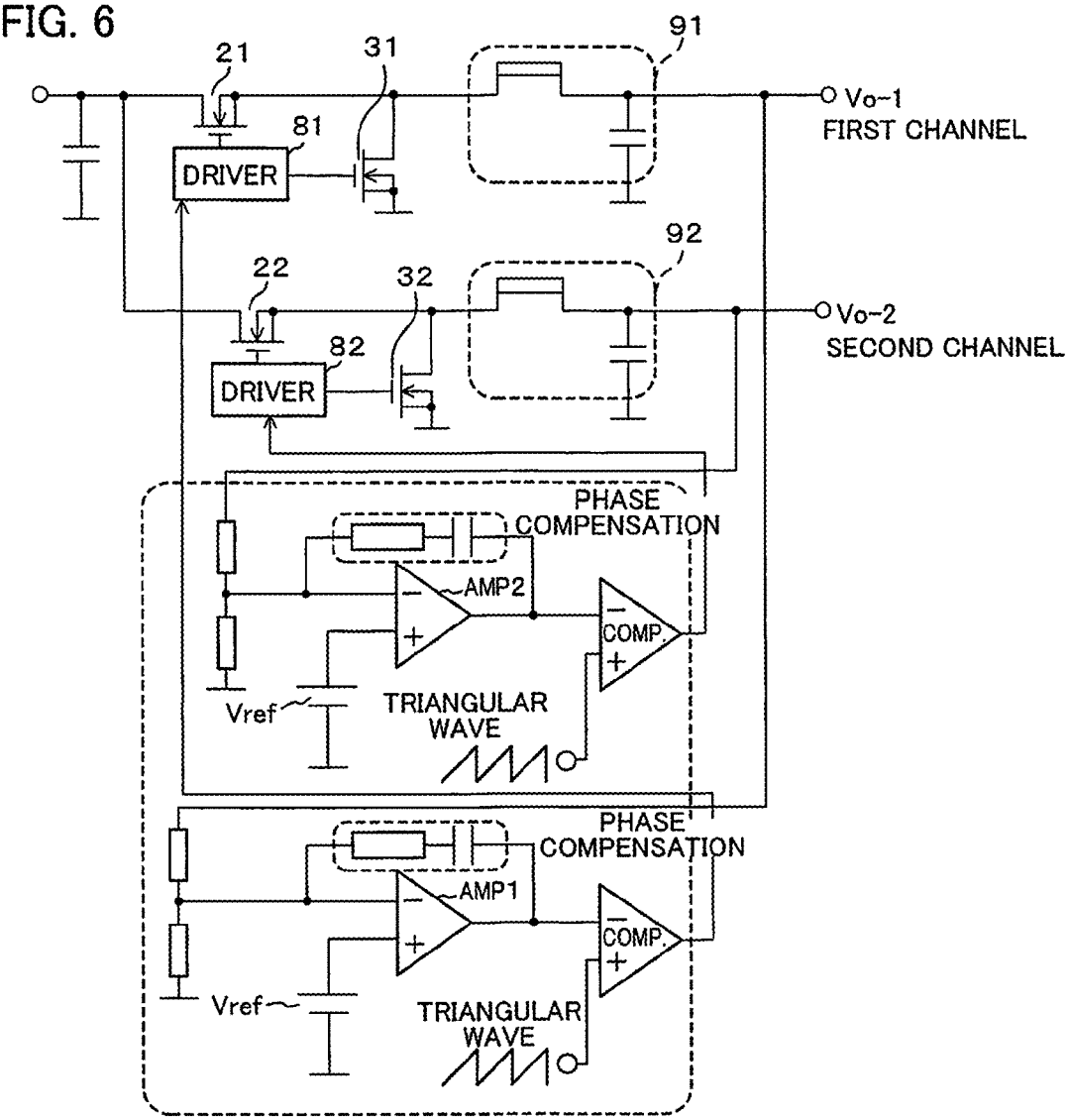
FIG. 6 is a diagram showing a prior-art two-channel power supply circuit using PWM control.
Figure 7:
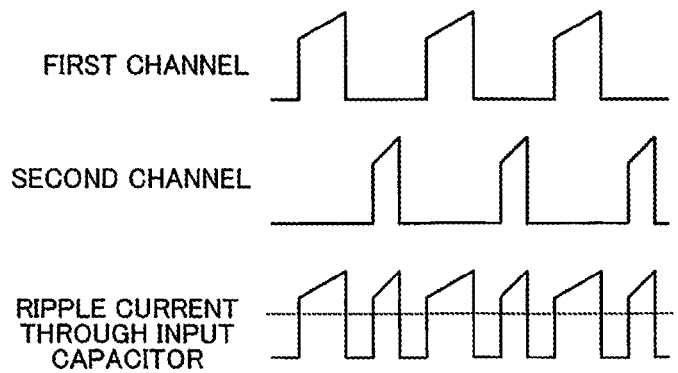
FIG. 7 is a diagram showing an input ripple current waveform of the prior-art two-channel power supply using PWM control.

FIG. 3 is a flowchart showing ON-time control for the switching elements 21 to 2N which is carried out by the arithmetic processing unit 7 of FIG. 1.

In an operating state, each of the first to N-th channels operates under digital control using nonlinear control, and the interval (time interval) between the time of turning ON of the switching element 21 and the time of turning ON of the switching element 2j (j=2, 3, . . . , N) is measured by a timer function of the arithmetic processing unit 7 as shown in FIG. 3, and (a) if the measured interval is within a predetermined range, operation is continued without changing the ON time of the switching element 2j used last time, but, (b) if the measured interval is out of the above-described range, the ON time of the switching element 2j is increased or decreased within a predetermined range and shifted from the basic frequency fch1 so that the interval between the times of turning ON of the switching element 21 and the switching element 2j may be brought back to the range.

Hereinafter, the flowchart of FIG. 3 will be described step by step.

First, when the switching element 2j of the switching power supply circuit 7j of the j-th channel (j=2, 3, . . . , N) has been turned ON, the arithmetic processing unit 7 measures the interval (time interval) between the time at which the switching element 21 of the switching power supply circuit 71 of the first channel has been turned ON and the time at which the switching element 2j has been turned ON (step sa01). Then, the arithmetic processing unit 7 determines whether the measured interval is within a specified range or not (step sa02). If the measured interval is within the specified range, the arithmetic processing unit 7 continues operation without changing the ON time of the switching element 2j used last time (step sa03), updates j (j=j+1), and returns to step sa01. Meanwhile, if the measured time interval is not within the specified range, the arithmetic processing unit 7 increases or decreases the ON time of the switching element 2j within a predetermined ON-time range, continues operation, updates j (j=j+1), and returns to step sa01.

The invention claimed is:

1. A two- or more-channel digitally controlled step-down DC/DC converter using fixed ON-time nonlinear control, comprising:

switching power supply circuits of first to N-th (where N is an integer not less than 2) channels, the switching power supply circuits being connected to an input terminal in parallel;

A/D converters for converting output voltages outputted from output terminals of the switching power supply circuits of the respective channels to digital signals; and an arithmetic processing unit receiving the digital signals converted by the A/D converters, wherein each of the switching power supply circuit includes
 a switching element having a first terminal connected to the input terminal to be turned on and off;
 an inductor having a first terminal connected to a second terminal of the switching element;
 a capacitor connected between a second terminal of the inductor and 0 volt; and
 a driving circuit for driving the switching element, and wherein the arithmetic processing unit is configured to measure a time interval between a time at which the switching element of the switching power supply circuit of the first channel has been turned ON and a time at which the switching element of the switching power supply circuit of the relevant one of the second to N-th channels has been turned ON, in case where the arithmetic processing unit determines that the switching element of the switching power supply circuit of each of the second to N-th channels has been turned ON, and, if the measured time interval is within a specified range, the arithmetic processing unit continues operation without changing an ON time of the switching power supply circuit used last time, but if the measured time interval is out of the specified range, the arithmetic processing unit increases or decreases the ON time of the switching element within a specified time range and continues operation so that the time interval may be brought back to the specified range, thereby shifting phases of switching of the switching elements of the power supply circuits of the respective channels to reduce overlaps between the ON times of the switching elements of the respective channels.

* * * * *